United States Patent
Ishida et al.

(10) Patent No.: US 6,717,982 B1
(45) Date of Patent: Apr. 6, 2004

(54) DATA COMMUNICATION APPARATUS

(75) Inventors: Takeo Ishida, Osaka (JP); Ryuzo Hagihara, Osaka (JP); Yasuhiro Yagi, Kyoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/534,230

(22) Filed: Mar. 24, 2000

(30) Foreign Application Priority Data

Mar. 25, 1999 (JP) .......................................... 11/080958

(51) Int. Cl.$^7$ ................................................. H04L 5/16
(52) U.S. Cl. ...................... 375/222; 375/225; 375/228; 370/230; 370/236; 370/252
(58) Field of Search ................. 375/219, 220, 375/222, 224, 225, 228; 370/252, 230–232, 235, 236

(56) References Cited

U.S. PATENT DOCUMENTS

| | | | | |
|---|---|---|---|---|
| 6,292,481 B1 | * | 9/2001 | Voit et al. .................. 370/217 |
| 6,304,595 B1 | * | 10/2001 | Pettersson et al. .......... 375/222 |
| 6,373,817 B1 | * | 4/2002 | Kung et al. ................ 370/217 |
| 6,483,870 B1 | * | 11/2002 | Locklear et al. ........... 375/222 |

\* cited by examiner

Primary Examiner—Stephen Chin
Assistant Examiner—Dac V. Ha
(74) Attorney, Agent, or Firm—Arent Fox Kintner Plotkin & Kahn, PLLC

(57) ABSTRACT

A controller of a data communication apparatus according to the present invention stores information on each successful and unsuccessful data communication, a season, a data of the week, a time, and a data communication rate of the communication for each site in a data memory. The controller reads out a data communication rate at which a data communication succeeded from the data memory and directs a modem to conduct a communication at the data communication rate. A data communication is conducted at the directed data communication rate. These procedures ensure a secure link between sites and a secure data communication irrespective of a line distance between the sites etc.

13 Claims, 3 Drawing Sheets

| A-site (Summer, Monday) | | | | | |
|---|---|---|---|---|---|
| time \ data communication rate (Kbps) | 33.6 | 31.2 | 28.8 | 14.4 | ------- |
| 8 a.m.- 8 p.m. | unsuccess | unsuccess | success | | |
| 8 p.m.- 11 p.m. | success | | | | |
| 11 p.m.- 8 a.m. | success | | | | |

Fig.3

| A-site (Winter, Monday) | | | | | |
|---|---|---|---|---|---|
| time \ data communication rate (Kbps) | 33.6 | 31.2 | 28.8 | 14.4 | ------- |
| 8 a.m.- 8 p.m. | unsuccess | unsuccess | success | | |
| 8 p.m.- 11 p.m. | success | | | | |
| 11 p.m.- 8 a.m. | unsuccess | unsuccess | success | | |

Fig.4

| B-site (Summer, Monday) | | | | | | |
|---|---|---|---|---|---|---|
| time \ data communication rate (Kbps) | 33.6 | 31.2 | 28.8 | 14.4 | 12.0 | ------- |
| 8 a.m.- 8 p.m. | | | | unsuccess | success | |
| 8 p.m.- 11 p.m. | | | | success | | |
| 11 p.m.- 8 a.m. | | | | success | | |

| A-site (Summer, Monday) |||||
|---|---|---|---|---|
| time \ data communication rate (Kbps) | 33.6 | 31.2 | -- | |
| 8 a.m.- 8 p.m. | unsuccess | unsuccess | | |
| | unsuccess | success | | |
| | unsuccess | unsuccess | | |

DATA COMMUNICATION APPARATUS

BACKGROUND OF THE INVENTION

1. Field of the Invention

This invention relates to a data communication apparatus, particularly relates to a data communication apparatus which ensures data communications with a plurality of sites.

2. Description of the Prior Art

In a general data communication between data communication apparatuses, a communication parameter is set on the basis of a result of training performed between modems of the data communication apparatuses, then communications are taken place by referring to the parameter. A data communication rate is given as one example of communication parameters. When the modem installed in the data communication apparatus corresponds to the communication standard V.32, a data communication rate is determined among data communication rates such as 33.6 Kbps at maximum, 31.2 Kbps, or 28.8 Kbps etc. depending on the training between both of the modems, and the data communication is taken place at that data communication rate.

There has been an increase in types and standards of modems in recent years, and it causes a problem that mutual linkage is not established within a training time prescribed by both modems, and thus a data communication can not be held.

A data communication is taken place through a communication network. For example, as shown in FIG. 5, when the own data communication apparatus 51 transmits data to an A-site 53 in a short distance, the data transmitted from the data communication apparatus 51 is sent to the A site 53 through a communication line 61, an X-exchange 52, and a communication line 62. When the own data communication apparatus 51 transmits data to a far B-site 55 and communication lines 63 and 64 are available, the data communication apparatus 51 transmits data to the B-site 55 through the direct way; through the communication line 61, the X-exchange 52, the communication line 63, a Y-exchange 54, and the communication line 64. When the communication lines 63 and 64 are not available, the data communication apparatus 51 transmits data to the B-site 55 through the communication line 61, the X-exchange 52, a communication line 65, a Z-exchange 56, and a communication line 66, avoiding the communication lines 63 and 64.

In case, as shown in FIG. 5, of a far distance communication or a complicated communication path such that the data is transmitted through the communication line 61, the X-exchange 52, the communication line 65, the Z-exchange 56, and a communication line 66, an error is likely to occur, causing unsuccessful data communication. In addition, in case that a communication status is not good even at a distance is short and a data communication rate is fast, an error is likely to occur, causing unsuccessful data communication.

SUMMARY OF THE INVENTION

The present invention was made to provide a data communication apparatus ensuring a link between sites. Furthermore, the present invention was made to provide a data communication apparatus capable of conducting a secure data communication irrespective of a line distance between the sites or a communication line status.

To achieve the above objective, a data communication apparatus, according to the present invention, for conducting a data communication with a plurality of sites on a basis of a predetermined communication parameter comprises storage means for storing a communication parameter used for a data communication and a result of the data communication conducted by the communication parameter, and control means for reading out an optimum communication parameter corresponding to a site with which a data communication is conducted from the storage means and conducting a data communication on the basis of the communication parameter.

The storage means stores a communication parameter used for a data communication and result information on whether the data communication conducted by the communication parameter succeeded or not for each site.

The control means reads out an optimum communication parameter corresponding to a site from the storage means and conducts a data communication on the basis of the communication parameter. By these procedures, a link between sites is ensured and furthermore, a data communication is conducted securely irrespective of a line distance between the sites and a line status.

In the data communication apparatus according to the present invention, the storage means stores a time when a data communication is conducted, and the control means reads out an optimum communication parameter corresponding to a site and a communication time from the storage means and conducts a data communication on the basis of the communication parameter.

Therefore, the storage means stores a time when the data communication is conducted for each site, in addition to a communication parameter and information on whether a data communication succeeded or not. When a data communication is conducted with a site, an optimum communication parameter is read out from the storage means corresponding to a site and a communication time, and a data communication is conducted by the communication parameter. Therefore, a link between sites is secured, and a data communication is conducted securely irrespective of a line distance between sites and a line status.

In the data communication apparatus according to this invention, the storage means stores a data communication rate as one of the communication parameters, and the control means reads out a communication parameter by referring to the stored data communication rate and conducts a data communication.

Therefore, the storage means stores a data communication rate as one of the communication parameter. When a data communication is conducted with a site, a communication parameter is read out by referring to a data communication rate at which a data communication succeeded, and a data communication is conducted by that communication parameter. A link between sites is ensured and a data communication is conducted securely irrespective of a line distance between sites and a line status.

BRIEF DESCRIPTION OF THE DRAWINGS

FIG. 3 is a chart of communication results with a A site;

FIG. 4 is a chart of communication results with a B site;

Figures 1, 2:
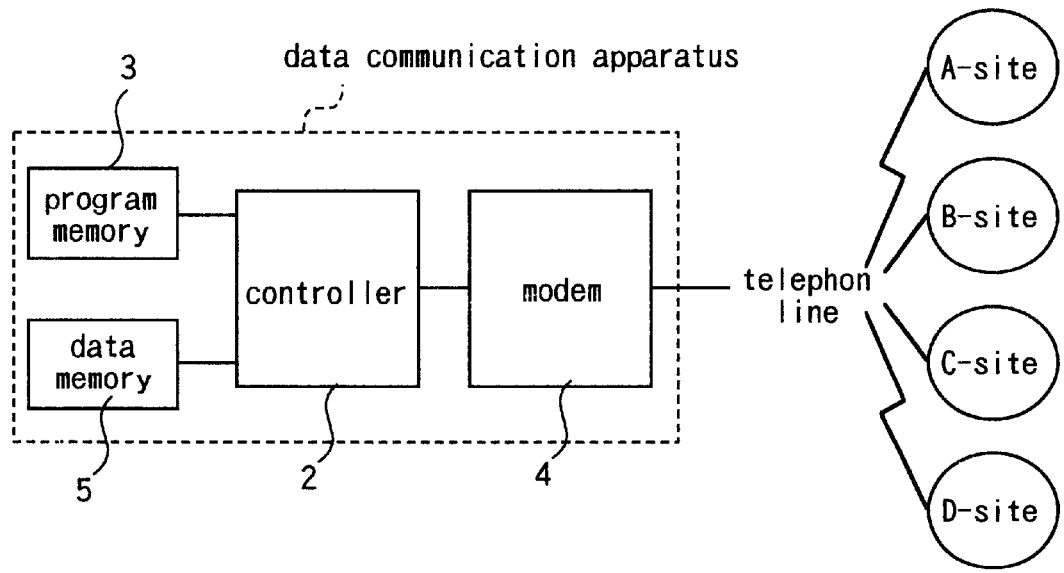
FIG. 1 is a circuit diagram of a data communication apparatus according to an embodiment of the present invention.
FIG. 2 is a chart of communication results with a A site.

The foregoing and other objects, features, aspects and advantages of the present invention will become more apparent from the following detailed description of the present invention when collected conjunction with the accompanying drawings.

DESCRIPTION OF THE PREFERRED EMBODIMENTS

An embodiment of a data communication apparatus according to the present invention is described by referring to FIGS. 1–5. In the embodiment, description is made on a data communication rate, as one of communication parameters, for simple explanation.

The data communication apparatus 1 comprises a controller 2, a program memory 3, a modem 4, and a data memory 5. The data communication apparatus 1 conducts a data communication with a site through a telephone line.

The controller 2 comprises a CPU etc, and controls the data communication apparatus 1 on the basis of a program stored in the program memory 3. In particular, in this embodiment, the controller 2 writes and rewrites result information of whether the data communication succeeded, corresponding to a site, a season, a date of the week, a time, and a data communication rate of the communication as a communication parameter, in a later described data memory 5, after the completion of the data communication. The controller 2 reads out the data communication rate, the season, the data, the time at which the communication with the site succeeded, from the data memory 5 at a time of a data communication with the site and directs the modem 4 to communicate with the site at that data communication rate. The controller 2 can be informed of the season by means of the program memory 3 and by detecting the communication date from a timer (not shown), together with the communication time and date of the week. Although this embodiment defines that spring is from April to June, summer is from July to September, fall is from October to November, and winter is from December to March, definitions are not limited to these but arbitrary modification is possible.

The program memory 3 stores a control operation which is taken by the controller 2, in a form of a program. The program memory 3 stores a program for determining a season by detection of date by the controller 2. The modem 4 modulates and demodulates data on the basis of the communication standard such as V.34 and V.32bis, and controls itself so as to communicate with a site at a data communication rate directed by the controller 2. For example, when the modem 4 can correspond to the communication standard V.34, the modem 4 controls itself to communicate at a data communication rate directed by the controller 2 among 33.6 Kbps at maximum, 31.2 Kbps, 28.8 Kbps etc. The modem 4 performs training with a modem of the site to be communicated. And when a communication is possible at the data communication rate directed by the controller 2, the modem 4 communicates at that data communication rate. When the communication is not possible at the data communication rate directed by the controller 2, the controller 2 directs the modem 4 to communicate at a data communication rate slower than previously directed. On the basis of this direction, the modem 4 trains with the modem of the site, and communicates at that data communication rate after determining the data communication rate by both of the modems.

The controller 2 writes information on whether a data communication succeeded or not corresponding to the site, the season, the date of the week, and the time of the communication, and the data communication rate in the data memory 5. And when the information on whether the data communication succeeded or not is stored in the data memory 5, the controller 2 rewrites the information, as information corresponding to the condition, at every calling to the site. Since a data communication rate at which a communication succeeds is different depending on a line distance between sites, information whether a data communication succeeded or not is stored for each communicated site. In addition, in a snowy region, snow piled on an electric wire causes a line failure or a line error, and a data communication rate at which a communication succeeds is different. When a communication line is not available, a roundabout communication line should be used in some seasons. Therefore, a data communication rate at which a communication succeeds is different. Furthermore, a line is used frequently on weekdays and it causes a line failure or a different route for communication from holidays should be used, and a data communication rate at which a communication succeeds is different. Therefore, information whether a data communication succeeded or not is stored on every day of the week when a communication is conducted. Information on whether a data communication succeeded or not is stored at each time of communications since a data communication rate at which a communication succeeds is different depending on the frequency of line use at day and night, and depending on error caused by snow on the electric wire in some regions at night.

One example of information stored in the data memory 5 is explained by referring to a chart in FIG. 2. The chart in FIG. 2 illustrates information on whether a data communication conducted with the A-site on a Monday of summer succeeded or not. The information on successful and unsuccessful data communication is stored corresponding to the time when the communication was conducted and the data communication rate as shown in FIG. 2. A time of communication is divided into three patterns, eight a.m. to eight p.m., eight p.m. to eleven p.m., and eleven p.m. to eight a.m. As a data communication rate, there are several patterns, 33.6 Kbps, 31.2 Kbps, 28.8 Kbps, and 14.4 Kbps etc.

It is found from FIG. 2 that the following information is stored. Information on an unsuccessful data communication is stored when a data communication has not succeeded at the data communication rate of 33.6 Kbps from eight a.m. to eight p.m. Further, information on an unsuccessful data communication is stored when a data communication has not succeeded at the data communication rate of 31.2 Kbps from eight a.m. to eight p.m. Furthermore, information of a successful data communication is stored when a data communication succeeded at the data communication rate of 28.8 Kbps from eight a.m. to eight p.m. In formation of a successful data communication is stored when a data communication succeeded at the data communication rate of 33.6 Kbps from eight p.m. to eleven p.m. Also, information of a successful data communication is stored when a data communication succeeded at the data communication rate of 33.6 Kbps from eleven p.m. to eight a.m.

Operations taken by the data communication apparatus 1 are explained by referring to FIGS. 2–4. The modem installed in the data communication apparatus 1 corresponds to the communication standard V.34.

If the data communication apparatus 1 has not communicated with the A-site, information on whether a data communication succeeded or not with the A-site is not stored in the data memory 5. In this case, when the data communication apparatus 1 tries to communicate with the A-site for the first time, the controller 2 directs the modem 4 to communicate at a data communication rate of 33.6 Kbps corresponding to the communication standard V.34. On the basis of the direction, the modem 4 controls itself to conduct a data communication at a data communication rate of 33.6 Kbps and performs training with a modem of the A-site. When the modem 4 and the modem at the A-site determine to conduct a data communication at the data communication rate directed from the controller 2, a data communication is conducted at that rate. For example, when the A-site can correspond to the communication standard V.34, training is performed between both of the modems. Then, when a data communication rate is determined as 33.6 Kbps, a communication is conducted at that data communication rate.

When a communication at a data communication rate of 33.6 Kbps has not completed successfully due to a troubled line status, the communication was conducted on a Monday of July at ten o'clock. Then, the controller 2 writes information of the unsuccessful data communication conducted on a Monday of summer from eight a.m. to eight p.m. at the data communication rate of 33.6 Kbps in a data memory 5.

Then, the controller 2 directs the modem 4 to communicate at a data communication rate of 31.2 Kbps, down one degree from 33.6 Kbps. In response to this, both of the modems determine to communicate at a data communication rate of 31.2 Kbps, and communicate at that rate. At this time again, the data communication does not success. The controller 2 writes information of an unsuccessful data communication conducted on a Monday of summer from eight a.m. to eight p.m. at the communication rate of 31.2 Kbps in the data memory 5. Then, the modem 4 communicates at a data communication rate of 28.8 Kbps in accordance with a direction from the controller 2. When the data communication succeeds, information on a successful data communication conducted on a Monday of summer from eight a.m. to eight p.m. at the communication rate of 28.8 Kbps is stored in the data memory 5.

Information produced by repeating the above operations as shown in a chart of FIG. 2 is stored in the data memory 5. FIG. 2 indicates other information such that data communications conducted at 33.6 Kbps on a Monday of summer from eight p.m. to eleven p.m. and from eleven p.m. to eight a.m. have succeeded. Information on whether data communications at a 14.4 Kbps data communication rate from eight a.m. to eight p.m., and at 31.2 Kbps and 28.8 Kbps from eight p.m. to eleven p.m. and from eleven p.m. to eight a.m. succeeded or not are not written, since data communications under these conditions have not been conducted yet. If a data communication is conducted under these conditions, information corresponding to that condition will be stored in the data memory 5.

When a data communication has conducted with the A-site on a Monday of winter, the controller 2 writes information on whether a communication with the A-site on a Monday of winter in succeeded or not the data memory 5 (FIG. 3). FIG. 3 indicates that a data communication has not succeeded from eight a.m. to eight p.m. at a data communication rate of 33.6 Kbps and 31.2 Kbps, but a data communication succeeded from eight a.m. to eight p.m. at 28.8 Kbps. Also, FIG. 3 indicates that a data communication from eight p.m. to eleven p.m. at a data communication rate of 33.6 Kbps succeeded. Data communications from eleven p.m. to eight a.m. at data communication rates of 33.6 Kbps and 31.2 Kbps have not succeeded and a data communication at a data communication rate of 28.8 Kbps succeeded. It is found from FIG. 3 in comparison with FIG. 2 that a data communication at one a.m. in summer succeeded at a data communication rate of 33.6 Kbps but has not succeeded in winter at a data communication rate of faster than 28.8 Kbps.

When a data communication has conducted with the B-site on a Monday of summer, information on whether a communication succeeded or not with the B-site on a Monday of summer is written in the data memory 5 (FIG. 4). A modem at the B-site corresponds to the communication standard V.32bis and an applicable data communication rate is 14.4 Kbps at maximum, and a communication is not conducted at a data communication rate faster than 14.4 Kbps. Therefore, a data communication is not conducted at data communication rates of 33.6 Kbps, 31.2 Kbps, and 28.8 Kbps. FIG. 4 indicates that a data communication has not succeeded from eight a.m. to eight p.m. at a data communication rate of 14.4 Kbps, but a data communication succeeded from eight a.m. to eight p.m. at a data communication rate of 12.0 Kbps. FIG. 4 also indicates that a data communication succeeded from eight p.m. to eleven p.m. and from eleven p.m. to eight a.m. at the data communication rate of 14.4 Kbps. It is found from FIG. 4 in comparison with FIG. 2 that a data communication rate at which a data communication succeeded is different between the sites A and B even when a season, a date of the week, and a time are same.

The controller 2 directs the modem 4 of a data communication rate on the basis of information stored in the data memory 5 and both of the modems determine to conduct communication at that data communication rate. Operations of the controller 2 for directing a data communication rate on the basis of information stored in the data memory 5 to the modem 4 are explained in the concrete.

When the data communication apparatus 1 conducts a data communication with the A-site on a Monday of summer at ten a.m., the controller 2 directs the modem 4 to communicate at a data communication rate of 28.8 Kbps on the basis of information stored in the data memory 5 (FIG. 2). When the data communication apparatus 1 conducts a data communication with the A-site on a Monday of summer at one a.m., the controller 2 directs the modem 4 to communicate at a data communication rate of 33.6 Kbps on the basis of information stored in the data memory 5 (FIG. 2). The controller 2 directs the modem of a data communication rate on the basis of information categorized by time, ensuring a secure data communication.

When the data communication apparatus 1 conducts a data communication with the A-site on a Monday of summer at one a.m., the controller 2 directs the modem 4 to communicate at a data communication rate of 33.6 Kbps on the basis of information stored in the data memory 5 (FIG. 2). When the data communication apparatus 1 conducts a data communication with the A-site on a Monday of winter at one a.m., the controller 2 directs the modem 4 to communicate at a data communication rate of 28.8 Kbps on the basis of information stored in the data memory 5 (FIG. 3). The controller 2 directs the modem of a data communication rate on the basis of information categorized by season, ensuring a secure data communication.

When the data communication apparatus 1 conducts a data communication with the A-site on a Monday of summer at one a.m., the controller 2 directs the modem 4 to communicate at a data communication rate of 33.6 Kbps on the basis of information stored in the data memory 5 (FIG. 2). When the data communication apparatus 1 conducts a data communication with the B-site on a Monday of summer at one a.m., the controller 2 directs the modem 4 to communicate at a data communication rate of 14.4 Kbps on the basis of information stored in the data memory 5 (FIG. 4). The controller 2 directs the modem of a data communication rate on the basis of information categorized by site, thus ensuring a secure data communication.

As described above, the controller 2 does not direct the modem 4 to communicate at a data communication rate which resulted in failure, but directs the modem 4 to communicate at a data communication rate which resulted in a successful data communication, ensuring a secure linkage between sites and ensuring a secure data communication irrespective of a line distance between the sites and a line status. Although the above description does not mention about information comparing with different dates, the controller 2 directs the modem 4 to communicate at a data communication rate corresponding to a date, ensuring a secure data communication.

Embodiments of the data communication apparatus 1 according to this invention are not limited to the above embodiments, but the following embodiments are also applicable.

Facsimile equipment can be used for a communication although the above embodiment describes an example of using a modem for a data communication.

Although the above embodiment only explains a data communication rate as a communication parameter, it is possible to add a factor that a line for communication is an analogue line or a digital line to communication parameters. In addition, an outgoing level can be added to the combination of communication parameters. The more factors are added as a communication parameter, the more secure data communication can be conducted.

Although information on successful or unsuccessful data communication is categorized by site, season, and date in the above embodiment, a condition which affects a result of a data communication such as weather can be added as a factor which categorizes information on a successful or unsuccessful data communication. As adding more factors, a data communication can be conducted more securely. When weather is added as one of factors, a user may input the information on weather at every communication by means of a ten key (not shown) etc.

Figures 5, 6:
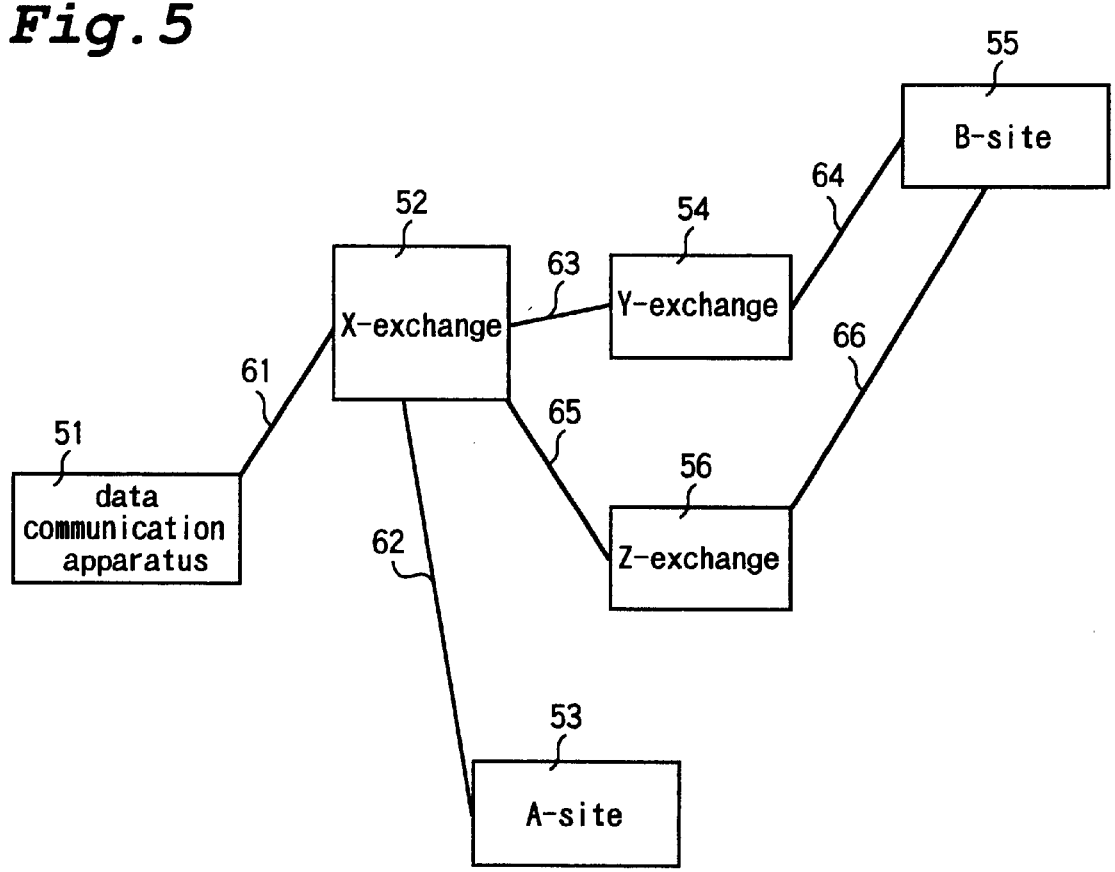
FIG. 5 is a diagram illustrating a communication path.
FIG. 6 is a chart of communication results with an A site in a case that a change is made in the present invention.

In the above embodiment, information on whether a data communications succeeded or not for one data communication is stored in the data memory 5. In other way, as shown in FIG. 6, results of the past three communications can be stored. When at least one communication succeeded among the three communications, a data communication is conducted with a site at that data communication rate. For example, FIG. 6 indicates one successful communication conducted with the A-site on a Monday of summer from eight a.m. to eight p.m. at a data communication rate of 31.2 Kbps. In that case, the controller 2 directs to conduct a next communication at a data communication rate of 31.2 Kbps. By using these processes, the controller 2 does not direct to conduct a communication at the communication rate of 33.6 Kbps at which a communication has never succeeded, but the controller 2 directs to conduct at 31.2 Kbps at which a communication may possibly be conducted even the previous communication did not succeed. If a communication at 31.2 Kbps results in success, an advantage such as a more efficient through put can be obtained than a communication at 28.8 Kbps.

In the above embodiment, information of successful and unsuccessful data communications is stored in the data memory 5 corresponding to a site, a season, a date of the week, a time and a data communication rate. In other case, this information can be learned by a neural network and an optimum data communication rate can be determined by using the neural network at a data communication. The neural network learns corresponding to each change in coupling coefficient, and a secure data communication can be achieved by using this.

A data communication apparatus according to the present invention is not limited to use for wired communication, but is possible for wireless communication.

Although the present invention has been described and illustrated in detail, it is clearly understood that the same is and example only and is not to be taken by way of limitation by way of illustration, the spirit and scope of the present invention being limited only by the terms of the appended claims.

What is claimed is:

1. A data communication apparatus for conducting a data communication with a plurality of sites on a basis of a predetermined communication parameter, comprising:

storage means for storing a communication parameter used for a data communication and a result of the data communication conducted by the communication parameter; and control means for reading out an optimum communication parameter corresponding to a site with which a data communication is conducted from said storage means and conducting a data communication on the basis of the communication parameter, wherein said storage means stores a communication parameter categorized by date and used for a data communication and result information of the data communication conducted by the communication parameter for each site, and said control means reads out an optimum communication parameter corresponding to a date from said storage means and conducts a data communication on the basis of the communication parameter.

2. The data communication apparatus according to claim 1, wherein said storage means stores a data communication rate as one of said communication parameters, and said control means reads out a communication parameter by referring to the stored data communication rate and conducts a data communication.

3. The data communication apparatus according to claim 1, wherein said storage means stores a plurality of result information of data communications conducted by each communication parameter, and said control means conducts a data communication on the basis of the communication parameter among the communication result information stored in said storage means if any one of the data communications succeeded.

4. A data communication apparatus for conducting a data communication with a plurality of sites on a basis of a predetermined communication parameter, comprising:

storage means for storing a communication parameter used for a data communication and a result of the data communication conducted by the communication parameter; and control means for reading out an optimum communication parameter corresponding to a site with which a data communication is conducted from said storage means and conducting a data communication on the basis of the communication parameter, wherein said storage means stores a communication parameter categorized by season and used for a data communication and result information of the data communication conducted by the communication parameter for each site, and said control means reads out an optimum communication parameter corresponding to a season from said storage means and conducts a data communication on the basis of the communication parameter.

5. The data communication apparatus according to claim 4, wherein said storage means stores a data communication rate as one of said communication parameters, and said control means reads out a communication parameter by referring to the stored data communication rate and conducts a data communication.

6. The data communication apparatus according to claim 4, wherein said storage means stores a plurality of result information of data communications conducted by each communication parameter, and said control means conducts a data communication on the basis of the communication parameter among the communication result information stored in said storage means if any one of the data communications succeeded.

7. A data communication apparatus for conducting a data communication with plurality of sites on a basis of a predetermined communication parameter; comprising:

storage means for storing a communication parameter used for a data communication and a result of the data communication conducted by the communication parameter; and control means for reading out an optimum communication parameter corresponding to a site with which a data communication is conducted from said storage means and conducting a data communication on the basis of the communication parameter, wherein said storage means stores a point in time when a data communication is conducted, and said control means reads out an optimum communication parameter corresponding to a site and a communication time from said storage means and conducts a data communication on the basis of the communication parameter.

8. A data communication apparatus for conducting a data communication with a plurality of sites comprising:

a modem for modulating and demodulating data;

storage means for storing a communication rate of said modem used in a data communication and result information of the data communication conducted at the communication rate for each site; and control means for reading out an optimum communication rate corresponding to a site with which a data communication is conducted from said storage means and conducting a data communication by setting a modem rate to the communication rate, wherein said storage means stores a communication rate categorized by date and used for a data communication and result information of the data communication conducted at the communication rate for each site, and said control means reads out an optimum communication rate corresponding to data from said storage means and conducts a data communication by setting a modem rate to the communication rate.

9. The data communication apparatus according to claim 8, wherein said storage means stores a time when a data communication is conducted, and said control means reads out an optimum communication rate corresponding to a site and a communication time from said storage means and conducts a data communication by setting a modem rate to the communication rate.

10. The data communication apparatus according to claim 8, wherein said storage means stores a plurality of result information of communications conducted by each communication rate, and said control means conducts a data communication on the basis of the communication rate among the communication results information stored in said storage means if any one of the data communications succeeded.

11. A The data communication apparatus for conducting a data communication with a plurality of sites comprising:

a modem for modulating and demodulating data;

storage means for storing a communication rate of said modem used in a data communication and result information of the data communication conducted at the communication rate for each site; and control means for reading out an optimum communication rate corresponding to a site with which a data communication is conducted from said storage means and conducting a data communication by setting a modem rate to the communication rate, wherein said storage means stores a communication rate categorized by season and used for a data communication and result information of the data communication conducted at the communication rate for each site, and said control means reads out an optimum communication rate corresponding to a season from said storage means and conducts a data communication by setting a modem rate to the communication rate.

12. The data communication apparatus according to claim 11, wherein said storage means stores a time when a data communication is conducted, and said control means reads out an optimum communication rate corresponding to a site and a communication time from said storage means and conducts a data communication by setting a modem rate to the communication rate.

13. The data communication apparatus according to claim 11, wherein said storage means stores a plurality of result information of communications conducted by each communication rate, and said control means conducts a data communication on the basis of the communication rate among the communication results information stored in said storage means if any one of the data communications succeeded.

* * * * *